Jan. 26, 1926.  1,570,838

C. JACKMAN

SHOE SOLE TRIMMER

Filed May 4, 1923

Inventor
CHARLES JACKMAN.
By his Attorney

Patented Jan. 26, 1926.

1,570,838

UNITED STATES PATENT OFFICE.

CHARLES JACKMAN, OF PORTSMOUTH, OHIO, ASSIGNOR OF ONE-HALF TO PEARL E. SELBY, OF PORTSMOUTH, OHIO.

SHOE-SOLE TRIMMER.

Application filed May 4, 1923. Serial No. 636,635.

*To all whom it may concern:*

Be it known that I, CHARLES JACKMAN, citizen of the United States, residing at Portsmouth, in the county of Scioto and State of Ohio, have invented certain new and useful Improvements in Shoe-Sole Trimmers, of which the following is a specification.

This invention appertains to certain improvements in material cutting or trimming apparatus generally, and more particularly to a type of the same usually employed in the trimming off of the edges of the soles of shoes.

The principal object of the invention is to provide for a guard or auxiliary cutter to be used in conjunction with ordinary forms of shoe sole trimming cutters, whereby to effect the smoothing or trimming down of the upper side of the outer edge of the sole simultaneously with the operation of the ordinary trimming cutter along the edge face thereof.

With the foregoing and other equally important objects in view, the invention resides in the certain new and useful construction and arrangement as will be hereinafter more fully described, set forth in the appended claims, and illustrated in the accompanying drawings, in which:—

Figure 1:
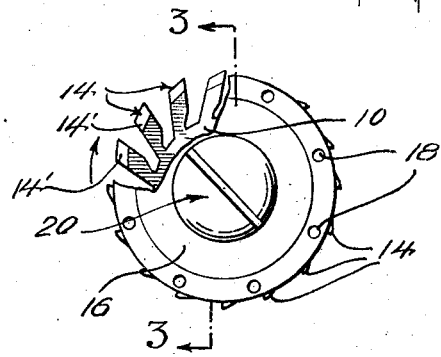
Figure 2:
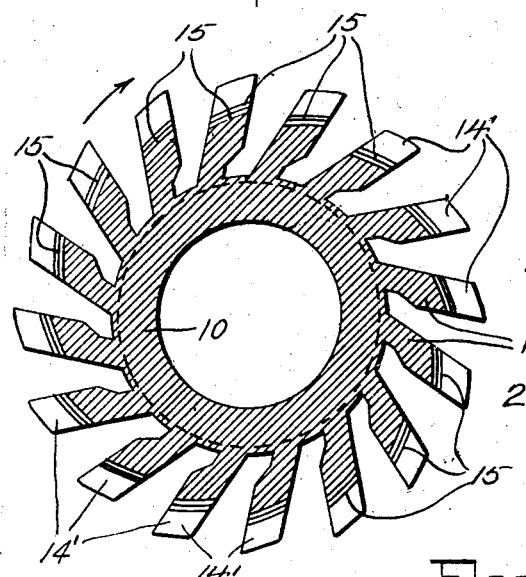
Figure 3:
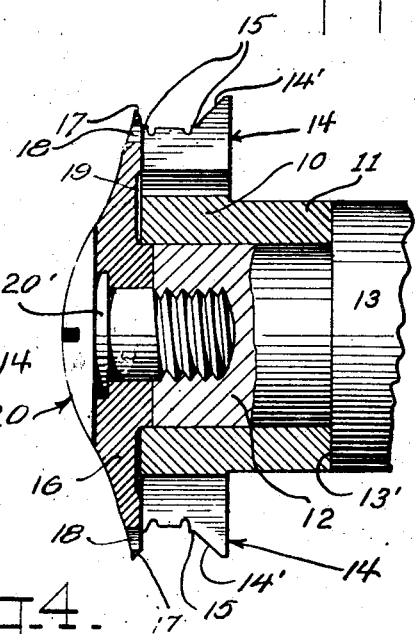
Figure 4:
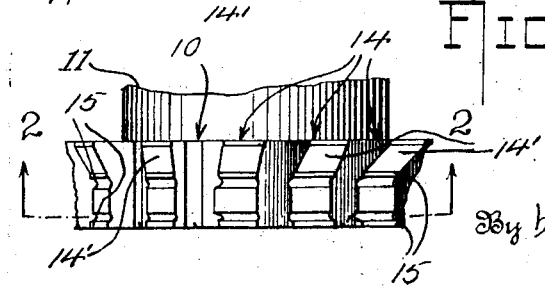

Figure 1 is an end elevation, partly in section, of the improved form of trimming cutter, and showing the manner of use of the same, Figure 2 is a sectional detail of a preferred embodiment of trimming cutter, the same being taken on the line 2—2 of Figure 4, Figure 3 is a vertical section taken on the line 3—3 of Figure 1, and, Figure 4 is a fragmentary plan view of the said trimming cutter.

Referring to the drawing, wherein similar characters of reference designate corresponding parts throughout the several views thereof, the numeral 10 indicates a circular cutter body formed to provide an offset concentric hub or sleeve portion 11 for engagement on the reduced end portion 12 of a driven shaft 13, the free end of the hub or sleeve 11 being disposed in abutting relation to the shouldered portion 13' at the inner end of the reduced portion 12, when in proper operating position thereon. This cutter body 10 is of any known or usual construction having equidistantly spaced cutting teeth 14 formed on the periphery thereof with beveled cutting lips 15 at their opposite ends and which operate to increase, to a slight extent, the depth of cut at the extreme upper and lower edges of the material, when the latter is held edgewise against the outer faces of the cutting teeth 14 for the purpose, substantially as shown.

Adapted to be abutted against the outer side of the cutter body, 10 is a cutter guard or shield 16, which is of a diameter slightly greater than that of the active cutting portion of the cutter body, so as to have its peripheral edge project beyond the outer of the lip portions 15 of the latter and to act in conjunction with the beveled face portions 14', at the inner ends of the cutter teeth 14, to accurately guide the material against the outer faces of the cutting teeth during the cutting or trimming operation. This guard or shield 16 is preferably formed to provide a thickened central portion having flat inner and outer faces and an outer portion beveled off from the edge of the outer flat face and outwardly therefrom to the peripheral edge so as to reduce the thickness of the latter to an appreciable extent. The inner side of the peripheral edge of the guard or shield 16 is sharply beveled, as at 17 in a reverse direction with respect to the bevel at the outer side thereof, whereby to provide a slight clearance between the same and the opposed surface of the material when the latter is being worked and is positioned with respect to the bevel faces of the outer cutting lips 15, so as to be continuous therewith substantially as is shown in Figure 3. This bevel 17 extends in the direction reversed to that of the bevel face portions 14', at the inner ends of the cutter teeth 14, and cooperate therewith to guide the material when the latter is moved against the outer faces of the cutting teeth 14. Formed inwardly of the peripheral edge of the guard or shield 16, and extending partly into the beveled portion 17 thereof, are a series of equidistantly spaced openings or circular holes 18, which open through the shield body in the path of the outer of the lip portions 15 in their cutting operation on the outer edge of the material, the openings or holes 18 being so arranged that the top edges of the said outer cutting lips 15 pass the same at their centers.

To effect the proper mounting of the guard or shield 16 in position, the bore of the cutter body 10 and the hub or sleeve portion 11 is of a slightly greater length than the reduced end portion 12 of the shaft 13, so that the thickened central portion of the guard or shield seats in the outer end of the said bore and abuts the outer end of the shaft portion 12. The inner flat face of the guard or shield 16 is formed to provide an annular groove or channel 19 in concentric relation to the inner seated portion of the thickened central portion thereof, and this groove or channel 19 is of a width to admit of the concentric portions of the inner face at the outer side thereof to firmly abut the outer end faces of the cutter teeth 15, and also provides for a clearance between the guard or shield 16 and the adjacent inner end portions of the cutter teeth 14 for the passage of the dust from the cutting or trimming operations from between the latter. The guard or shield 16 is secured in position by means of a screw 20 which is passed through an opening formed centrally through the thickened portion thereof and into engagement with a threaded recess in the outer end of the shaft end 12. The outer end of the screw receiving opening in the guard or shield 16, is preferably formed with a counter bore to seat therein a shouldered portion 20′, formed immediately inward of the head of the screw 20, which, in turn, abuts the outer flat face of the centrally thickened portion of the guard or shield, the opposed face portions of the latter and the screw head, together with the shouldered portion 20′, being of a substantial area to assure of the firm and uniform clamping of the parts together.

In the trimming operation on the edge of a shoe sole or the like, and with the parts constructed and assembled as herein before indicated, the edge of the sole or material is disposed tangentially to the peripheral edge of the cutter body 10 and is pressed against the outer faces of the cutters 14 between the side beveled faces 14′ thereof and the opposed inner beveled edge 17 of the guard or shield 16, which beveled faces and edge act to effect the accurate seating of the material against the cutters 14. During the cutting or trimming operation, should any tearing or shredding of the fibers of the material occur, especially at the outer or upper side of the edge thereof, these torn or shredded portions are removed by reason of the cooperation between the openings 18, in the guard or shield 16, and the outer of the cutting lips 15, of the cutting teeth 14, the same acting to shear off between them all of such torn or shredded portions and in a manner to leave the finished edge of the material continuously smooth throughout its extent. The cutting action of the lips 15, of the rotary cutter 10, is such as to skive the edge of the material, and, in so doing, very often turns up a fuzzy edge on the latter, and, in the use of the guard or shield 16 in conjunction with the cutter 10, and providing the latter with the holes 18 to cooperate with the cutting lips 15, this fuzzy edge is entirely eliminated. In practice, it has been found that the rapid rate of speed at which the cutter 10 is ordinarily driven, that the peripheral edge portion of the guard or shield 16 has imparted thereto a whipping action which gives to the sides of the holes 18 an abrading effect, which, in conjunction with the cutting action of the outer edge of the cutting lip 14′, results in the desired smooth finish of the edge of the material.

From the foregoing, it will be readily apparent that, while a preferred embodiment of the cutting or trimming mechanism has been described and illustrated herein in specific terms and details of construction and arrangement of parts, various changes in and modifications of the same may be resorted to without departing from the spirit of the invention, or the scope of the claims appended hereto.

Having thus fully described the invention, what is claimed, is:—

1. The combination with a rotary cutter for trimming the edge of shoe soles and the like, of a guard mounted at one side of said cutter and having openings therein inwardly of the edge cooperative with the cutting elements of the cutter for trimming the adjacent side edge of the edge face of a shoe sole being worked.

2. The combination with a shoe sole trimming mechanism, of a driven shaft, a cutter mounted at the outer end of said shaft, and an annular guard disposed at the outer side of said cutter and having transverse bores therein cooperative with the cutting elements of the cutter for trimming the adjacent side edge of the edge face of a shoe sole being worked.

3. The combination with a shoe sole trimming mechanism, of a driven shaft, a cutter mounted at the outer end of said shaft, a circular guard disposed at the outer side of said cutter and having transverse bores extending therethrough cooperative with the cutting elements of the cutter for trimming the adjacent side edge of the edge face of a shoe sole being worked, and means for securing said guard in position at said shaft end.

4. The combination with a shoe sole trimming mechanism, of a rotary trimming element having its peripheral edge formed to provide a plurality of cutting teeth thereon, cutting lips formed at the outer side edges of said cutting teeth, and an annular guard disposed at the outer side of said trimming element and having a series of openings formed transversely therein for cooperation with said cutting lips whereby to effect the smooth trimming of the adjacent side edge of the edge face of a shoe sole being worked.

5. In a shoe sole trimming mechanism, a rotary trimming member having a peripheral series of cutting teeth thereon, cutting lips formed on said member at the outer side edge thereof, a circular guard disposed in abutting relation at the outer side of said trimming member with its peripheral edge extending beyond the teeth of said member, said guard having an annular series of circular bores therethrough in alignment with the cutting lips of said trimming member for trimming the edge face of a shoe sole being worked.

CHARLES JACKMAN.